United States Patent [19]

Enneking et al.

[11] E Re. 28,514

[45] Reissued Aug. 12, 1975

[54] DEVICE FOR WINDING TEXTILE THREADS

[75] Inventors: Heinrich Enneking, Karlsruhe-Waldstadt; Gunter Jahrig, Neureut, both of Germany

[73] Assignee: Industrie Werke Karlsruhe-Augsburg Aktiengesellschaft, Karlsruhe, Germany

[22] Filed: Feb. 26, 1973

[21] Appl. No.: 335,920

Related U.S. Patent Documents

Reissue of:

[64] Patent No.: 3,628,741
Issued: Apr. 1, 1974
Appl. No.: 852,366
Filed: Aug. 22, 1969

[30] Foreign Application Priority Data

Sept. 11, 1968 Germany ..... 1785322

[52] U.S. Cl. ..... 242/18 DD; 242/18 A; 242/35.5 R
[51] Int. Cl. ..... B65h 54/20; B65h 54/42
[58] Field of Search ..... 242/18 DD, 18 A, 35.5 R

[56] References Cited

UNITED STATES PATENTS

| | | | |
|---|---|---|---|
| 2,647,697 | 8/1953 | Pollock, Jr. | 242/35.5 R |
| 2,869,796 | 1/1959 | Konig | 242/35.5 R |
| 2,919,865 | 1/1960 | Doherty | 242/35.5 R |
| 3,092,339 | 6/1963 | Hill, Jr. et al. | 242/18 DD |
| 3,165,274 | 1/1965 | De Priest | 242/18 A |
| 3,409,238 | 11/1968 | Campbell et al. | 242/18 A |

*Primary Examiner*—Stanley N. Gilreath
*Attorney, Agent, or Firm*—Michael S. Striker

[57] ABSTRACT

The device for winding textile threads is provided with a roll rotating about a horizontal axis, two bobbin supports disposed below a horizontal plane passing through the axis of rotation of said roll and adapted to be brought into and out of frictional driving engagement with the circumference of said roll, and a horizontally reciprocable thread guide disposed vertically above a surface line of said roll arranged in said horizontal plane. The thread to be wound moves downwardly from said thread guide, engages said roll at said surface line and extends along a portion of said roll until it reaches a point where one of the bobbin supports engages the roll. The thread is now wound on the bobbin support and when the bobbin is completed the thread is transferred to the second bobbin support which has been brought into engagement with the roll. While the second bobbin is wound, the first one is removed from its bobbin support.

6 Claims, 3 Drawing Figures

DEVICE FOR WINDING TEXTILE THREADS

Figure 1:
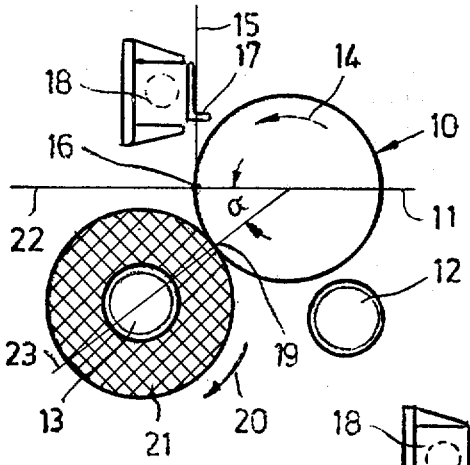

Matter enclosed in heavy brackets [ ] appears in the original patent but forms no part of this reissue specification; matter printed in italics indicates the additions made by reissue.

---

The invention relates to a device for winding textile threads, particularly textile threads of synthetic material, for producing bobbins. The device of the invention is provided with at least two bobbin supports for receiving each one bobbin and a single drive device for these bobbins and also a traversing device having a reciprocating thread guide for guiding a thread or a bundle of threads.

Winding devices of the above-described type are already known in which the drive of the bobbins takes place by friction and also directly by drive means acting directly on the bobbins, whereby in the last-mentioned drive means a speed control means is required which assures that for the purpose of driving the bobbin with a constant speed the number of revolutions of the drive motor is varied in relation to the increasing diameter of the bobbin.

In a winding device which is particularly of interest in connection with the present invention and which employs a friction drive there has been employed already heretofore a device in which two bobbins are arranged one above the other and on one side of a common drive roll. The bobbins are carried by bobbin supports which are slidably mounted in parallel guides arranged vertically with respect to the axis of rotation of the drive roll. According to another known arrangement, the two superimposed bobbin are arranged on one side of the drive roll in pivotally mounted levers. In the first-mentioned known winding device, which is disclosed in the German Pat. specification No. 1,083,486, the bobbins are pressed by weights against the drive roll whereby the weights are attached by means of ropes to the bobbin supports, while according to the U.S. Pat. specification No. 2,293,825, the pressing of the bobbins against the drive roll is effected by spring power.

In both of these known winding devices, the feed of the threads to the bobbin supports or to the bobbin sleeves on these supports is effected by reciprocating thread guides moving lengthwise of the bobbin supports in such a manner that the threads wound upon the upper and lower bobbins driven by the common drive roll run first upon the upper bobbin and that one thread is directly wound upon the same, while the other thread encloses the upper bobbin only along a portion of its circumference and then partly encloses a portion of the circumference of the drive roll and then is wound upon the lower bobbin. The thread guide is arranged on the side of the drive roll above the periphery of the mantle of the upper bobbin, so that a substantial constant drag length of thread or double threads are formed by the thread guide. A condition of the constancy of these drag lengths is, however, that during the winding operation the thread is always wound upon the upper bobbin. If the thread is wound only on the lower bobbin, a not satisfactory formation of the bobbins would occur in view of the inconveniently long drag length. Accordingly, the above two known devices can only then be used properly when both bobbin supports or the bobbins thereon are driven at the same time by the drive roll to wind threads thereon and that both bobbins are removed at the same time to be replaced at the same time by empty bobbin sleeves. Since, however, melt spinning devices for the purpose of spinning of threads of synthetic material for technical reasons have to operate continuously, a considerable amount of thread is being wasted and is lost during such change of bobbin sleeves.

An object of the present invention is now a thread-winding device which does not have the disadvantages of the above-described known winding devices. The winding device of the present invention is provided with at least two bobbin supports provided—if desired—each with a plurality of coaxially arranged bobbins, whereby these bobbin supports are all driven by a single drive device—for instance a drive roll—and which does not waste any valuable thread material when the bobbins are removed or exchanged.

In the winding device of the present application, is employed a drive roll against which are pressed the bobbin sleeves which are to be provided with the bobbins. The thread is supplied to the bobbin sleeves by a longitudinally reciprocating thread guide which is arranged at a predetermined distance above a surface line of the drive roll, whereby this surface line is arranged in a horizontal plane which extends through the axis of rotation of the drive roll. Furthermore, the thread or the thread bundle which is supplied to the drive roll engages the circumference of the drive roll along a predetermined distance and finally is transferred to the bobbin sleeve at a point through which a normal line passes which forms with the horizontal normal line passing though the contact point of the thread with a circumference of the drive roll an angle which is different from zero.

This novel arrangement of the present invention assures that regardless whether one or all bobbins engage the drive roll, the drag length of the thread between the thread guide and the point where the thread engages the drive roll remains always constant. This assures first of all, a constantly uniform built-up of the bobbins. The particular advantage of this arrangement consists, however, in this, that the bobbins may be removed from the bobbin supports without any loss of valuable thread material. When in accorrdance with the device of the invention one bobbin has attained the desired bobbin diameter, then a second bobbin or bobbin sleeve may be brought into frictional engagement with the drive roll and the thread from the completed bobbin can then be pulled around the drive roll and can be brought into engagement with the second bobbin sleeve which just has been brought into frictional engagement with the circumference of the drive roll, so that now the thread is being wound on the last-mentioned bobbin core to form a bobbin thereon. When this is accomplished, then the previously formed bobbin is brought out of frictional engagement with the drive roll and then is removed from its bobbin support. The empty bobbin support is then provided with another bobbin sleeve and thereupon the same procedure already described is repeated, so that as soon as the second bobbin is completed, the thread is again transferred to the now empty bobbin sleeve on the first bobbin support. In this manner, the loss of thread material during the change of the bobbins is not only substantially reduced, but will be practically zero.

In accordance with another embodiment of the invention, the thread guide is arranged vertically above the surface line of the drive roll to which the thread or a thread bundle is guided, while the contact line which follows in the direction of rotation to the bobbin sleeve and to which the thread is transferred is arranged below the horizontal plane which passes through the axis of rotation of the drive roll.

The present invention is suitable for winding devices in which the bobbing are pressed against the drive roll and are rotated by the latter due to the frictional engagement therewith, but may also be employed in connection with bobbins which are directly driven, in which case, the mentioned roll is freely rotatably mounted and is driven by the bobbins which are pressed against the circumference of the roll.

With the foregoing and other objects in view, the invention will now be described with reference to the accompanying drawing which illustrates a few embodiments of the new thread-widing device.

Figure 2:
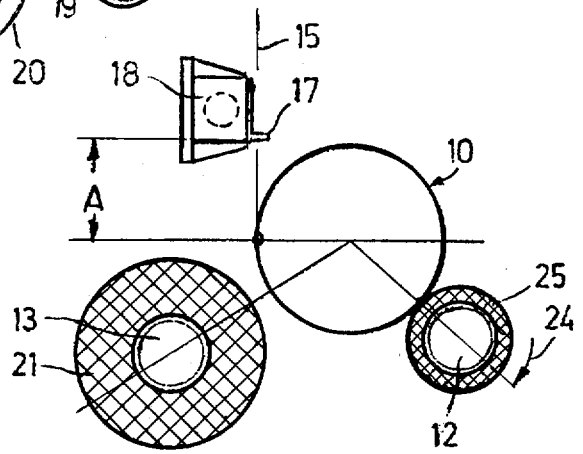
Figure 3:
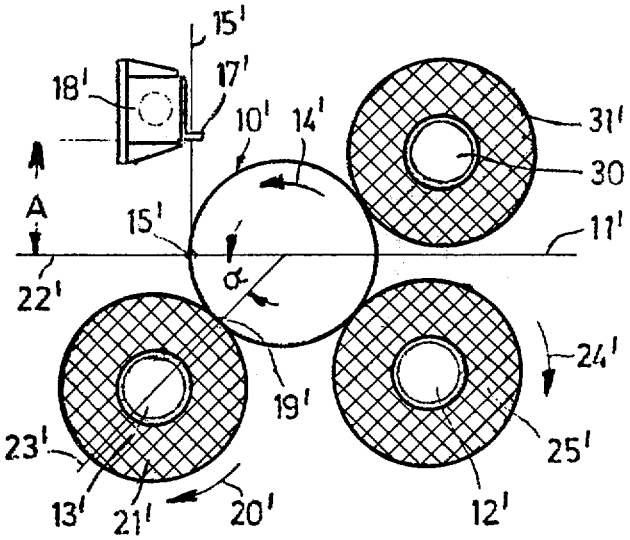

In the drawing:

FIG. 1 illustrates in an end view a winding device with one completely wound bobbin, ready for removal and with one empty bobbin support, FIG. 2 illustrates the same device as shown in FIG. 1, except with the completely wound bobbin shifted away from the drive roll and the empty bobbin support shifted into frictional driving engagement with the drive roll, and FIG. 3 illustrates a modified winding device with three simultaneously driven bobbins.

Referring to the FIGS. of the drawing, all of the bobbins are driven by a friction drive in that the bobbins are caused to be moved with their circumferences in frictional engagement with the circumference of a driven roll. In all these winding devices the axes of the drive roll and the bobbin supports are disposed at right angles to the longitudinal direction of the machine which latter comprises a plurality of such winding devices arranged one next to the other.

In the winding device illustrated in the FIGS. 1 and 2, two bobbin supports 12, 13 are arranged below the horizontal plane which passes through the axis of rotation of the drive roll 10. Furthermore, these bobbin supports 12 and 13 are disposed symmetrically to both sides of a vertical plane passing through the axis of rotation of the drive roll 10. The bobbin supports 12, 13 may each be rotatably supported in pivotally mounted levers or in guides extending parallel to the horizontal plane 11 in which the axis of rotation of the drive roll 10 is disposed. The arrangement is such that the bobbin supports by means of a predetermined force are urged with their circumference of the drive roll 10, whereby, however, the bobbin supports, for the purpose of removing the bobbins therefrom, may be shifted away from the circumference of the drive roll 10. The particular displacement of the bobbin supports and also the specific arrangement and mounting of the bobbin sleeves on their bobbin supports are not of particular importance for the present invention and, therefore, are not disclosed in detail.

The direction of rotation of the drive roll 10 is counterclockwise—as indicated by the arrow 14—when viewed from the position of the operator who watches the winding operation. The thread 15 moves vertically downward and at 16 engages tangentially the circumference of the drive roll 10 along a line which coincides with the horizontal plane 11 passing through the axis of rotation of the drive roll 10. The thread 15 is guided by a thread guide 17 which is disposed at a vertical distance A from the point 16 and by means of a traversing device 18 is moved along the horizontal surface line of the drive roll 10 represented by the point 16 back and forth. In this manner, there is formed on the bobbin sleeve mounted on the bobbin support the desired bobbin. The thread 15 from the point 16 on downward surrounds partly the circumference of the drive roll 10, namely along a portion which is indicated by the angle $\alpha$, and at the point 19 is transferred to the bobbin sleeve on the bobbin support 13 which is rotated by the drive roll 10 clockwise as indicated by the arrow 20 to form a bobbin 21 thereon.

In accordance with the invention, all of the winding devices have the feature that the horizontal line 22 extending through the engagement point 16 of the thread on the drive roll 10 and which also is disposed in the horizontal plane 11 encloses with the inclined line 23 extending through the contact point 19 and axis of rotation of the drive roll 10 in the direction of rotation of said drive roll 10 an angle $\alpha$ which is different from zero.

In FIG. 1 the winding device is in an operative position in which the bobbin support 13 carries on a bobbin sleeve a bobbin 21, while the bobbin support 12 is in a rest position, namely, out of driving engagement with the drive roll 10. For the purpose of removing the bobbin 21 from the bobbin support 13, the other bobbin support 12 is shifted into frictional engagement with the drive roll 10 either by pivoting the supporting levers or by moving the support 12 along its guides and then the thread 15 below the thread guide 17 is moved laterally of the bobbin 21 and is caused to engage the bobbin sleeve on the bobbin support 12. This completes the winding of the bobbin 21 and the thread 15 is now—as shown in FIG. 2—wound upon the bobbin support 12 in the direction of the arrow 24 to form the bobbin 25 thereon. Now the other bobbin support 13 can be shifted with the bobbin 21 thereon away from the drive roll 10 and the bobbin 21 can be removed from the bobbin support 13. The braking of the rotating bobbin 21 until it stops and the removal of the bobbin 21 from the bobbin support 13 and the attachment of an empty bobbin sleeve onto the bobbin support take place in conventional manner.

FIG. 3 illustrates a winding device which differs from the one illustrated in the FIGS. 1 and 2 in the provision of an additional bobbin support 30 on which a bobbin 31′ is formed. In FIG. 3 the same parts employed also in the FIGS. 1 and 2 are provided with the same reference characteristics provided with an (′) accent. The normal lines are designated 22′ and 23′, the engagement point with 16′, the contact point with 19′ and the bobbin with 21′. The normal lines 22′ and 23′ enclose an angle $\alpha$ which is different from zero. In this modified winding device the thread guide 17′ does not guide a single thread but a bundle of three threads 15′ of which one thread each is wound upon each of the bobbins 21′, 25′ and 31′.

The winding device illustrated in FIG. 3 is intended to show that it is possible to employ more than two bobbin supports. It is even possible to employ in another modified winding device four bobbin supports all of which may be driven by a single drive roll, and the arrangement can be made that two bobbins are wound at the same time, whereby the advantage of a loss-free bobbin change is maintained.

What we claim is:

1. A device for winding a textile thread, particularly a thread made of synthetic material, comprising a rotatable roll, at least two bobbin supports adapted to be pressed in frictional engagement with the circumference of said roll and also adapted to be moved away from said roll, and a horizontally reciprocable thread guide arranged at a predetermined distance above an axially extending surface line of said roll which line is arranged in a horizontal plane passing through the axis of rotation of said roll, said thread contacting said roll at said surface line and extending from said surface line in contact with the roll along the short circumferential distance in the direction of rotation of said roll until the thread reaches a point where a first one of said bobbin supports engages said roll so that said thread is wound upon said bobbin support to form a bobbin thereon, the normal line extending through said last-named point and the axis of rotation of said roll enclosing with the normal line extending through said surface line and said axis of rotation an angle which is different from zero, a second one of said bobbin supports being disposed laterally spaced from said first-mentioned bobbin support and below said horizontal plane passing through the axis of rotation of said roll, whereby said thread may be transferred to said second one of said bobbin supports when the bobbin formed on the first-mentioned support is completed and whereby bobbins fomed on said bobbin supports are adapted to engage said roll along lines disposed below said horizontal line passing through the axis of rotation of said roll.

2. A device for winding textile threads, particularly threads made of synthetic material, comprising a rotatable roll, three bobbin supports adapted to be pressed in frictional engagement with three different points of the circumference of said roll and also adapted to be moved away from said roll, and a horizontally reciprocable guide for a bundle of three threads arranged a predetermined distance above an axially extending surface line of said roll which line is arranged in a horizontal plane passing through the axis of rotation of said roll, said threads contacting said roll at said surface line and extending from said surface line in contact with the roll along a short circumferential distance in the direction of rotation of said roll until the threads reach a point where a first one of said bobbin supports engages said roll and winds one of said threads upon said first bobbin to form a bobbin thereon the normal line extending through said last-named point and the axis of rotation of said roll enclosing with the normal line extending through said last-named point and the axis of rotation of said roll enclosing with the normal line extending through said surface line and said axis of rotation an angle which is different from zero, a second one of said three bobbin supports being disposed laterally spaced from said first-mentioned bobbin support and below said horizontal plane for winding thereon a second thread of said bundle when said second bobbin support engages said roll, a third one of said three bobbin supports being disposed spaced above said second bobbin support and above said horizontal line passing through the axis of rotation of said roll, said third bobbin support being adapted to wind thereon the third thread of said bundle when said third bobbin support engages said roll.

*3. A device for winding textile thread, particularly textile thread of synthetic material, comprising a roll mounted for rotation in a predetermined direction about a substantially horizontal axis; at least a first and a second bobbin support located at one side of a line passing through said axis normal thereto and being spaced from one another in circumferential direction of said roll, said bobbin supports being mounted for movement into and out of frictional engagement with the periphery of said roll at a first and a second locus, respectively, and at least one of said bobbin supports being permanently positioned below a horizontal plane which passes through said axis and is above the locus of frictional engagement associated with said one bobbin support; and thread guide means reciprocable longitudinally of said axis at the opposite side of said line above said horizontal plane and positioned for guiding thread into contact with said periphery at a contact point which is located in said horizontal plane and from which said thread extends in said direction about said periphery to said first locus for winding upon said first bobbin support to form a bobbin thereon, and for subsequent transfer to said second locus and winding upon said second bobbin support when the bobbin formed on said first bobbin support is completed.*

*4. A device for winding textile thread, particularly textile thread of synthetic material, comprising a roll mounted for rotation in a predetermined direction about a substantially horizontal axis; at least a first and a second bobbin support located at one side of a line passing through said axis normal thereto and being spaced from one another in circumferential direction of said roll, said bobbin supports being mounted for movement into and out of frictional engagement with the periphery of said roll at a first and a second locus, respectively, and both of said bobbin supports being permanently positioned below a horizontal plane which passes through said axis and is above said loci of frictional engagement; and thread guide means reciprocable longitudinally of said axis at the opposite side of said line above said horizontal plane and positioned for guiding thread into contact with said periphery at a contact point which is located in said horizontal plane and from which said thread extends in said direction about said periphery to said first locus for winding upon said first bobbin support to form a bobbin thereon, and for subsequent transfer to said second locus and winding upon said second bobbin support when the bobbin formed on said first bobbin support is completed.*

*5. A device for winding textile thread, particularly textile thread of synthetic material, comprising a roll mounted for rotation in a predetermined direction about a substantially horizontal axis; a first and a second bobbin support located at one side of a line passing through said axis normal thereto and being spaced from one another in circumferential direction of said roll, said bobbin supports being mounted for movement into and out of frictional engagement with the periphery of said roll at a first and a second locus, respectively, and at least one of said bobbin supports being permanently positioned below a horizontal plane which passes through said axis and is above the locus of frictional engagement associated with said one bobbin support; thread guide means reciprocable longitudinally of said axis at the opposite side of said line above said horizontal plane and positioned for guiding thread into contact with said periphery at a contact point which is located in said horizontal plane and from which said thread extends in said direction about said periphery to said first loccus for winding*

*upon said first bobbin support to form a bobbin thereon, and for subsequent transfer to said second locus and winding upon said second bobbin support when the bobbin formed on said first bobbin support is completed and an additional bobbin support spaced from said first and second bobbin supports circumferentially of said roll and permanently positioned above said horizontal plane, said additional bobbin support being movable into and out of*

*frictional engagement with said periphery at a third locus.*

*6. A device as defined in claim 3, wherein the angle included in said direction between said horizontal plane and an imaginary line passing through said axis and said first locus is different from zero.*

* * * * *